(12) United States Patent
Molnar

(10) Patent No.: US 6,421,543 B1
(45) Date of Patent: Jul. 16, 2002

(54) CELLULAR RADIOTELEPHONE BASE STATIONS AND METHODS USING SELECTED MULTIPLE DIVERSITY RECEPTION

(75) Inventor: Karl J. Molnar, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/592,925

(22) Filed: Jan. 29, 1996

(51) Int. Cl.$^7$ .............................. H04B 1/38; H04M 1/00
(52) U.S. Cl. ...................... 455/562; 455/272; 455/277.2
(58) Field of Search ........................ 455/137, 132–135, 455/140, 272, 277.1–277.2, 53.1, 561, 562, 273; 375/347; H04Q 7/00, 9/00; H04B 1/38; H04M 1/00

(56) References Cited

U.S. PATENT DOCUMENTS

| | | | |
|---|---|---|---|
| 4,072,956 A | 2/1978 | Provencher | 343/844 |
| 4,101,836 A | 7/1978 | Craig et al. | 325/302 |
| 4,128,740 A | 12/1978 | Graziano | 179/2 |
| 4,724,441 A | 2/1988 | Fithian et al. | 342/368 |
| 4,733,402 A * | 3/1988 | Monsen | 455/134 |
| 4,823,136 A | 4/1989 | Nathanson et al. | 342/368 |
| 5,166,693 A | 11/1992 | Nishikawa et al. | 342/422 |
| 5,191,598 A | 3/1993 | Bäckström et al. | 375/100 |
| 5,274,844 A * | 12/1993 | Harrison et al. | 455/25 |
| 5,313,660 A * | 5/1994 | Lindenmeier et al. | 455/135 |
| 5,339,086 A | 8/1994 | DeLuca et al. | 342/371 |
| 5,390,342 A * | 2/1995 | Takayama et al. | 455/134 |
| 5,499,397 A * | 3/1996 | Wadin et al. | 455/277.1 |
| 5,548,835 A * | 8/1996 | Sasaki | 455/133 |
| 5,581,260 A | 12/1996 | Newman | 342/374 |
| 5,621,770 A * | 4/1997 | Zastera | 375/347 |
| 5,724,666 A * | 3/1998 | Dent | 455/562 |
| 5,740,526 A * | 4/1998 | Bonta et al. | 455/277.2 |

(List continued on next page.)

FOREIGN PATENT DOCUMENTS

| | | | |
|---|---|---|---|
| EP | 0 620 657 A1 | 10/1994 | ............ H04B/7/08 |
| JP | 07 050626 A | 6/1995 | |
| WO | WO 92/02996 | 2/1992 | |
| WO | WO 95/33312 | 12/1995 | ............ H04B/7/00 |
| WO | WO 96/36136 | 11/1996 | ............ H04B/7/10 |

OTHER PUBLICATIONS

International Search Report for PCT/US 97/00592, dated Jun. 17, 1998.
Lee, et al., "*Polarization Diversity System for Mobile Radio*", IEEE Transactions on Communications, vol. COM–20, No. 5, Oct. 1972.
Stapleton et al, A Cellular Base Station Phase Array Antenna System, IEEE, 1993, pp. 93–96.

(List continued on next page.)

Primary Examiner—Vincent F. Boccio
(74) Attorney, Agent, or Firm—Myers Bigel Sibley & Sajovec

(57) ABSTRACT

A cellular radiotelephone base station communicates with cellular radiotelephones by receiving cellular radiotelephone communications energy from cellular radiotelephones on an antenna array, processing the received communications energy to produce at least three processed radiotelephone communications signals representing communications energy received from a coverage sector, and selecting at least two of the processed signals for decoding in a conventional decoder. Preferably, the selected signals are the processed signals having the highest power or signal quality. Diversity gain is achieved by processing the received communications energy to produce at least two processed first polarization signals representing received communications energy having a first polarization and at least two processed second polarization signals representing received communications energy having a second polarization, and selecting at least one of the processed first polarization signals and at least one of the second polarization processed signals for decoding. Preferably the selected processed first polarization and second polarization signals are the signals from each polarization having the highest power or signal quality.

24 Claims, 12 Drawing Sheets

U.S. PATENT DOCUMENTS 5,933,787 A * 8/1999 Gilhousen et al. ........... 455/562
5,983,118 A * 11/1999 Lee ............................. 455/562
6,006,113 A * 12/1999 Meredith ..................... 455/562

OTHER PUBLICATIONS

Lemieux et al., Experimental Evaluation of Space/Frequency/Polarization Diversity in the Indoor Wireless Channel, IEEE Transactions on Vehicular Technology, vol. 40, No. 3, Aug. 1991, pp. 569–574.

Polarisation Diversity in Portable Communications Environment, Electronics Letters, vol. 22, No. 11, May 22, 1986, pp. 609–610.

Cox et al., Cross–Polarization Coupling Measured for 800 MHz Radio Transmission In and Around Houses and Large Buildings, IEEE Transactions on Antennas and Propagation, vol. AP–34, No. 1, Jan. 1986, pp. 83–87.

Cox, Antenna Diversity Performance on Mitigating the Effects of Portable Radiotelephone Orientation and Multipath Propagation, IEEE Transactions on Communications, vol. COM–31, No. 5, May 1983, pp. 620–628.

Lee, Combining Technology, Mobile Communications Engineering, Chapter 10, 1982, pp. 291–336.

Henry et al., A New Approach to High–Capacity Digital Mobile Radio, The Bell System Technical Journal, vol. 60, No. 8, Oct. 1981, pp. 1891–1904.

* cited by examiner

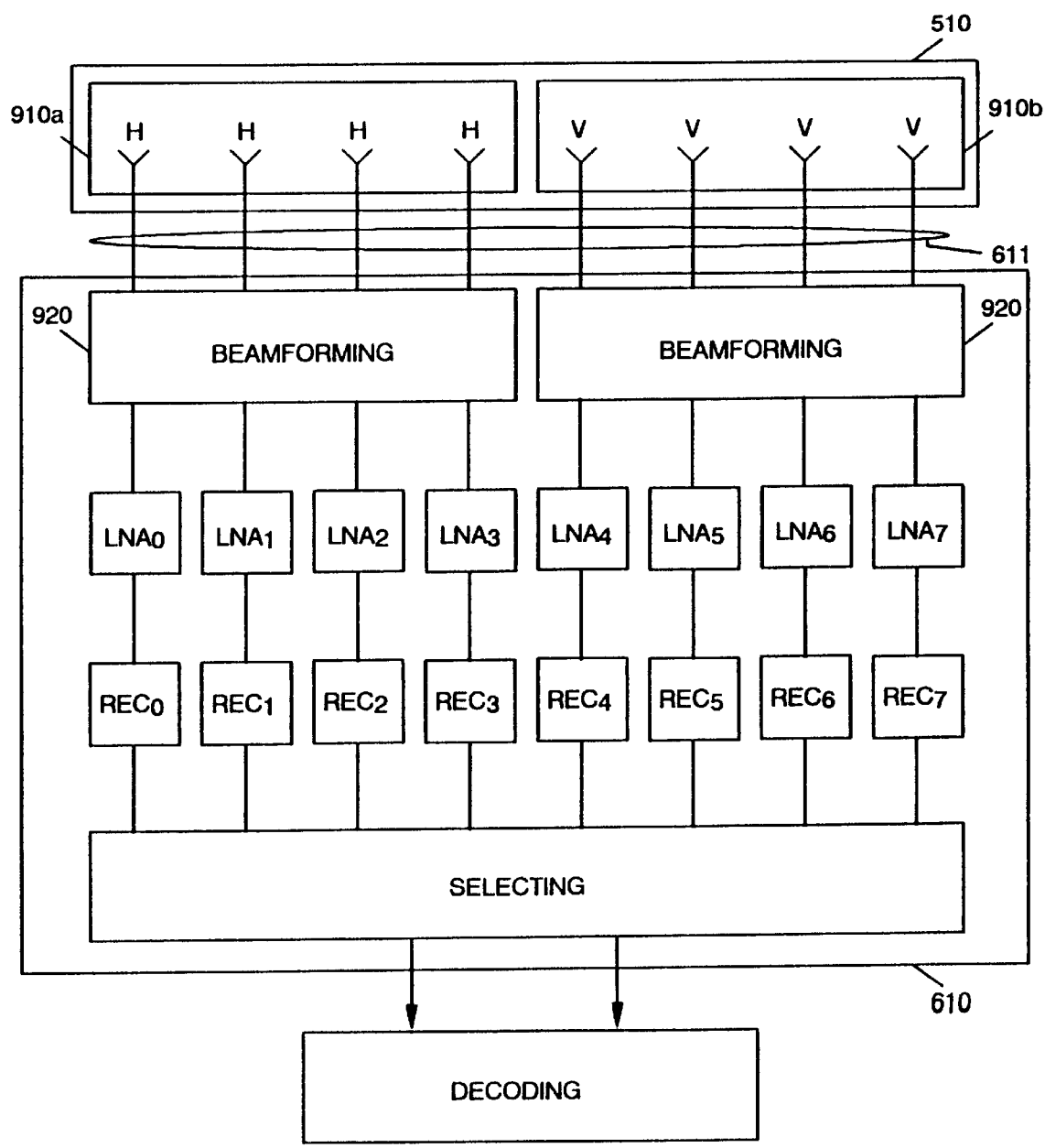

CELLULAR RADIOTELEPHONE BASE STATIONS AND METHODS USING SELECTED MULTIPLE DIVERSITY RECEPTION

FIELD OF THE INVENTION

The present invention relates generally to communications systems, more specifically, to cellular radio communications base stations and associated methods.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. More recently, digital cellular systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Frequency reuse is commonly employed in cellular technology wherein groups of frequencies are allocated for use in regions of limited geographic coverage known as cells. Cells containing equivalent groups of frequencies are geographically separated to allow mobile units in different cells to simultaneously use the same frequency without interfering with each other. By so doing many thousands of subscribers may be served by a system of only several hundred frequencies. In the United States, for example, Federal authorities have allocated to cellular communications a block of the UHF frequency spectrum further subdivided into pairs of narrow frequency bands called channels. Channel pairing results from the frequency duplex arrangement wherein the transmit and receive frequencies in each pair are offset by 45 MHz. At present there are 832, 30-KHz wide, radio channels allocated to cellular mobile communications in the United States. To address the capacity limitations of this analog system a digital transmission standard has been provided, designated IS-54B, wherein these frequency channels are further subdivided into 3 time slots.

As illustrated in FIG. 1, a cellular communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of mobile stations and more than one MTSO. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two mobile stations 21 or, between a mobile station 21 and a landline telephone user 33. The function of the base station 23 is commonly to handle the radio communication with the mobile station 21. In this capacity, the base station 23 functions chiefly as a relay station for data and voice signals.

The base station 23 also supervises the quality of the link 32 and monitors the received signal strength from the mobile station 21.

A typical base station 23 as in the prior art is schematically illustrated in FIG. 2 which shows, as an example, the functional components of model number RBS 882 manufactured by Ericsson Telecom AB, Stockholm, Sweden for the CMS 8800 cellular mobile telephone system. A full description of this analog cellular network is provided in publication number EN/LZT 101 908 R2B, published by Ericsson Telecom AB.

A now common sight along many highways, the base station 23 includes a control unit 34 and an antenna tower 35. The control unit 34 comprises the base station electronics and is usually positioned within a ruggedized enclosure at, or near, the base of the tower. Within this enclosure are the radio control group 37, or RCG, an exchange radio interface (ERI) 38 and a primary power supply 41 for converting electric power from the AC grid to power the individual components within the base station 23, and a backup power supply 42.

The ERI 38 provides signals between the MTSO 25 and the base station 23. The ERI 38 receives data from the RCG 37 and transfers it to the MTSO 25 on a dedicated MTSO-BS link 45. In the reverse direction, the ERI 38 receives data from the MTSO 25 and sends it the RCG 37 for subsequent transmission to a mobile station 21.

The radio control group 37 includes the electronic equipment necessary to effect radio communications. A functional block diagram of an RCG 37 as in the prior art is shown in FIG. 3. The configuration shown illustrates one control channel transmit/receive module (TRM) 51, a number of voice channel TRMs 52, and one signal strength receiver 53, as is a typical configuration required to serve one cell or sector of a cell. Each TRM 51, 52 includes a respective transmitter 54, receiver 55 and control unit 57. The TRMs 51, 52 typically are not frequency agile and operate instead on only one predetermined channel. Control signals from the ERI 38 are received by the individual control units 57. Voice and data traffic signals are routed over a separate interface to the ERI 38.

Each individual transmitter 54 for control and voice is connected to a transmit combiner 58. The transmit combiner combines all of the input signals onto a single output coupled through a coaxial cable 62 to the transmit antenna 63. Through the use of the combiner 58, up to 16 transmitters 54 can typically be connected to a common transmit antenna 63. The combiner 58 is used because there is often a premium for space on the masts and towers used to support the antennas. In an extreme case, one mast may be required to support over 100 radio channels.

One visible feature of a typical base station 23 is the antenna tower 35. In order to achieve a reasonable coverage area, the antennas 63, 65 are desirably mounted at some distance above the ground. Referring now additionally to the prior art schematic plan view illustration of FIG. 4A, in rural areas the towers 35 are commonly located at the center of a cell 36 thereby providing omni-directional coverage. In an omni-directional cell, the control channel(s) and the active voice channel(s) are broadcast in all areas of the cell— usually from a single antenna. Where base stations 23 are more densely located, a sectorized antenna system may be employed as in the prior art, and shown by the schematic diagram of FIG. 4B. Sectorization requires directional antennas 70 having, for example, a 120 degree radiation pattern as illustrated in FIG. 4B. Each sector 71 is itself a cell having its own control channel(s) and traffic channel(s). Note that "channel" may refer to a specific carrier frequency in an analog system or to a specific carrier/slot combination in a hybrid TDMA/FDMA system, such as IS-54 and GSM.

Each of two receive antennas 65 is coupled to a respective receive combiner 66A, 66B where the signals received are separated according to frequency and passed on to the individual receivers 55 in each of the TRMs 51, 52. The signals received often suffer from the detrimental effects of interference and fading. For this reason the two receive antennas 65 are typically spaced a distance apart, often more than ten times the carrier signal wavelength, so that they may receive signals from different signal paths which exhibit uncorrelated fading, thereby providing spatial diversity reception.

Diversity reception involves combining signals from two or more antennas. There are many conventional techniques for both pre-detection and post-detection diversity combining which are described, for example, in Chapter 10 of the book entitled "*Mobile Communications Engineering*", by William C. Y. Lee, published by McGraw-Hill, 1992. A typical diversity combiner takes a signal from each of two antennas, assigns a weighting factor to each signal according to indices of quality, such as carrier-to-noise ratio or mean signal power, and combines the signals according to these weighting factors to produce a single enhanced quality signal.

Despite the theoretical advantages of space diversity in cellular system base station receiving antennas, sufficient separation may not always be obtainable. In other words, the antenna tower may not permit a sufficient physical separation of receive antennas to achieve uncorrelated fading for receive signals. This also applies in applications using beamforming techniques, which often require that elements of the receive antenna array be separated by a wavelength or less. In addition, the orientation of the linearly polarized mobile antenna may not always be in alignment with the typically vertically polarized receive antenna at the base station, causing polarization mismatch fading.

It is known that polarization diversity reception may be used to enhance signal quality. Polarization diversity reception takes advantage of the low correlation between signals of differing polarizations. It involves combining signals of differing polarizations, typically orthogonal to each other, using diversity combining techniques similar to those employed in spatial diversity techniques. Polarization diversity reception is described, for example, in Chapter 9 of "*Mobile Communications Engineering*", by William C. Y. Lee.

For both spatial and horizontal diversity reception, it is possible to achieve greater diversity gain by adding additional antennas and passing the additional signals received into a higher order diversity combiner. However, this approach increases computational and hardware complexity due to the need for a more complex higher-order diversity combiner. As many existing base stations employ two spatially diverse antennas coupled to a two-branch diversity combiner, adapting these stations for use with multiple antennas may necessitate replacement of existing two-branch combiners. Moreover, the increase in gain achieved with higher-order diversity combining generally diminishes with increasing order, and additional noise is injected from signal branches exhibiting poorer quality, such as low carrier-to-noise ratio or high levels of interference.

SUMMARY OF THE INVENTION

In the light of the foregoing, it is therefore an object of the present invention to provide cellular radiotelephone base stations capable of enhanced communication with cellular radiotelephones, particularly in view of fading and/or interference.

It is another object of the present invention to provide improved cellular radiotelephone base stations and methods for enhanced cellular radiotelephone communications without the need to add undue complexity to the design of cellular radiotelephone base station elements.

These and other objects, advantages, and features of the present invention are provided by a cellular radiotelephone base station which produces at least three processed radiotelephone communications signals from a cellular radiotelephone antenna array and signal selecting means for selecting at least two but less than all of the processed radiotelephone communications signals. The selected signals may then be passed to a decoder, such as a conventional two-branch combiner. The base station can thereby be adapted for use with multiple antennas, without requiring undue replacement of other hardware elements.

In particular, according to the present invention, a cellular radiotelephone base station includes a cellular radiotelephone receive antenna array for receiving cellular radiotelephone communications energy representing cellular radiotelephone communications from cellular radiotelephones. Cellular radiotelephone communications processing means is responsive to the antenna array, for processing the received cellular radiotelephone communications energy to produce at least three processed radiotelephone communications signals, each representing the cellular radiotelephone communications energy received from a coverage sector. Processed radiotelephone signal selecting means is responsive to the processing means, for selecting at least two but less than all of the at least three processed radiotelephone communications signals. Decoding means is responsive to the signal selecting means, for decoding the radiotelephone communications from the at least two but less than all of the at least three processed radiotelephone communications signals.

The present invention offers the advantages of diversity reception of signals from multiple antenna arrays without requiring the increased complexity and cost of combining of all of the signals received from multiple antennas in a single diversity combiner, by selecting particular processed radiotelephone communications signals for input into a lower-order diversity combiner. The present invention can thus provide for a greater variety of combinations of processed radiotelephone communications signals. The present invention can also provide for enhanced diversity reception by preventing injection of noise from signals having poor quality, such as low carrier-to-noise ratio, into the diversity combiner. In addition, the present invention may allow the use of existing lower-order diversity combiners with higher-order multiple antenna arrays.

According to the present invention, the radiotelephone signal selecting means preferably selects on a basis such as highest power or signal quality. Preferably, the radiotelephone signal selecting means selects only two of the processed radiotelephone communications signals, to be passed on to a conventional two-branch combiner. The decoding means preferably comprises equalizing means, such as an equalizer for performing a weighted combining of the selected processed cellular radiotelephone signals according to certain characteristics, such as carrier to noise ratio and signal power. It will be understood that the radiotelephone receive antenna array may comprise at least three antenna elements, such as individual horizontal or vertical dipole antennas. It will also be understood that the processing means may comprise beamforming means, such as beamforming hardware for producing antenna beams from an antenna array, with one or more beams covering a coverage sector.

In another aspect of the present invention, the processing means may include means for producing at least two processed first polarization radiotelephone communications signals, each representing cellular radiotelephone communications energy received from a coverage sector and having a first polarization and at least two processed second polarization radiotelephone communications signals, each representing radiotelephone communications received from a coverage sector and having a second polarization. The two polarizations preferably are orthogonal to each other, for example, horizontal and vertical.

The processed radiotelephone signal selecting means selects at least one of the at least two processed first polarization radiotelephone communications signals and at least one of the at least two processed second polarization radiotelephone communications signals. The selecting means preferably selects from the processed radiotelephone communications signals representing each polarization on a basis such as highest power or highest signal quality. The present invention thus provides for enhanced polarization diversity reception.

The cellular radiotelephone receive array may comprise at least three antenna array elements, such as dipole antennas. The four antenna array elements may comprise at least two antenna elements for receiving radiotelephone communications energy having the first polarization and at least two antenna elements for receiving radiotelephone communications energy having the second polarization.

The cellular radiotelephone signal processing means may comprise beamforming means, such as beamforming hardware for producing antenna beams from an array of antenna elements. Preferably, each beam covers a coverage sector and receives cellular radiotelephone communications energy having a particular polarization. Preferably, the coverage sector of an antenna beam having the first polarization will overlap with the coverage sector of an adjacent antenna beam having the second polarization.

A method aspect of the present invention operates a cellular radiotelephone base station for communicating with at least one cellular radiotelephone. Cellular radiotelephone communications energy, representing cellular radiotelephone communications from cellular radiotelephones, is received on a cellular radiotelephone receive antenna array. The received cellular radiotelephone communications energy is processed to produce at least three processed radiotelephone communications signals, each representing the cellular radiotelephone communications energy received from a coverage sector. At least two but less than all of the at least three processed radiotelephone communications signals are selected. The radiotelephone communications from the at least two but less than all of the at least three processed radiotelephone communications signals are decoded. Enhanced cellular radiotelephone communications are thereby provided, without the need to add undue complexity to the base station elements.

BRIEF DESCRIPTION OF THE DRAWINGS

FIG. 9 is a block diagram illustrating a cellular radiotelephone base station including polarization diversity reception and beamforming according to the present invention;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
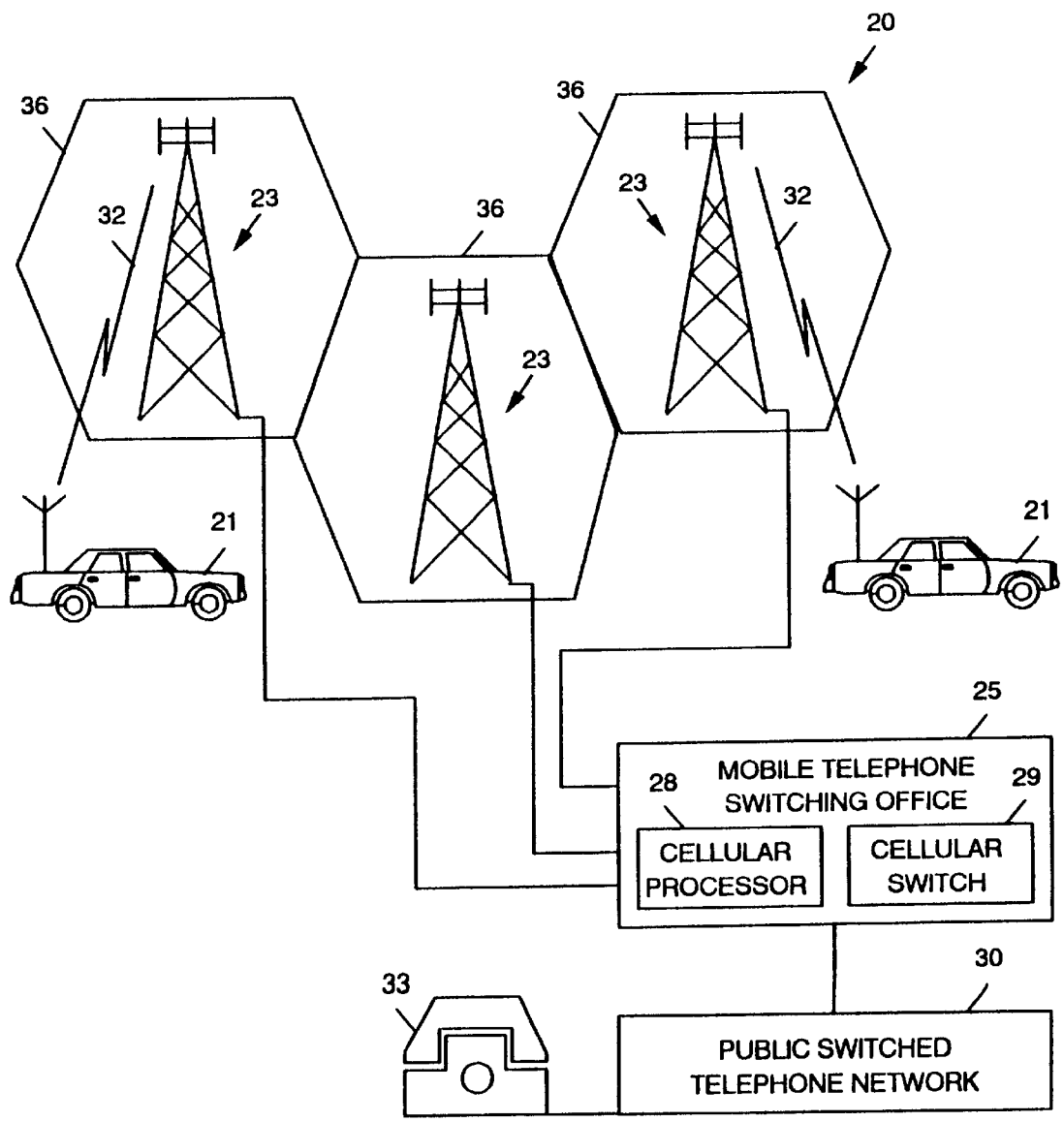
FIG. 1 is a schematic block diagram illustrating the basic components of a cellular communications system as in the prior art.
Figure 2:
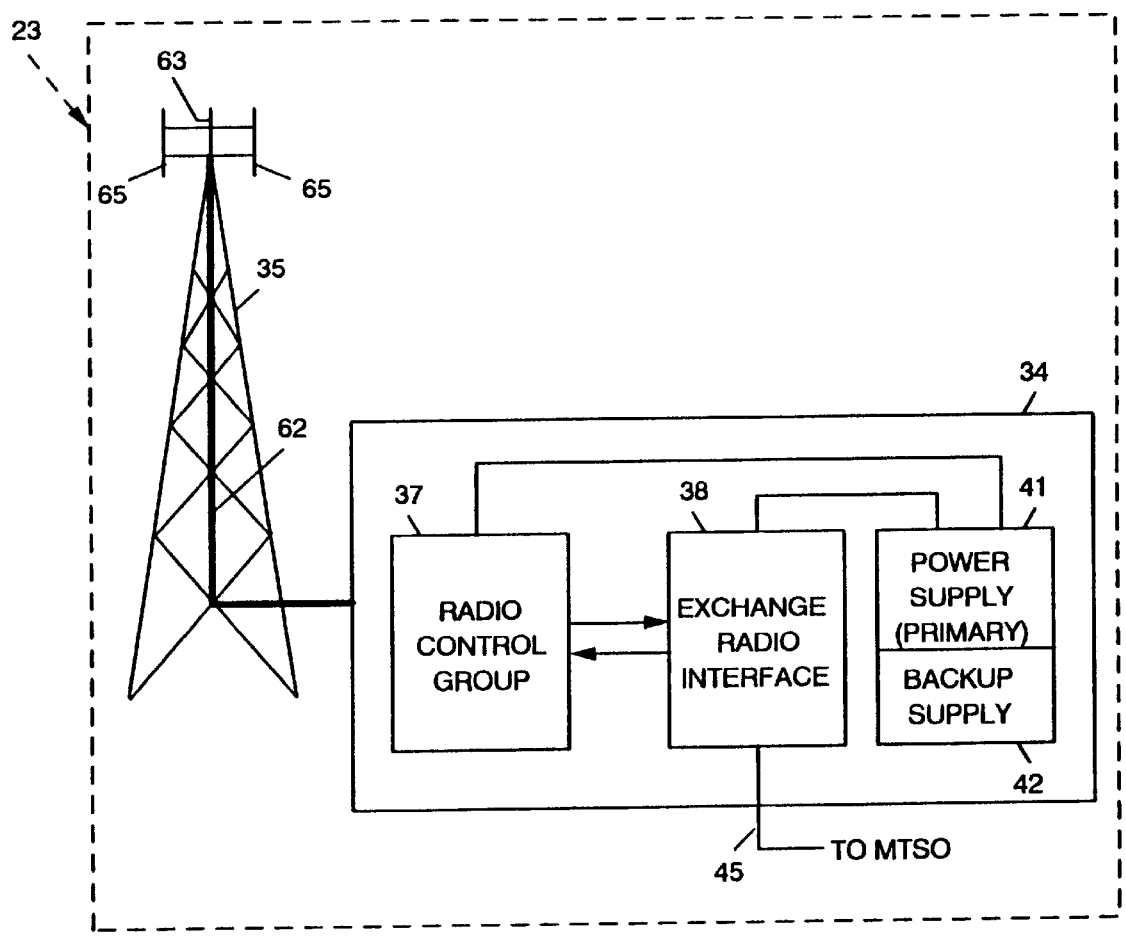
FIG. 2 is a schematic block diagram illustrating the functional components of a cellular communications base station as in the prior art.
Figure 3:
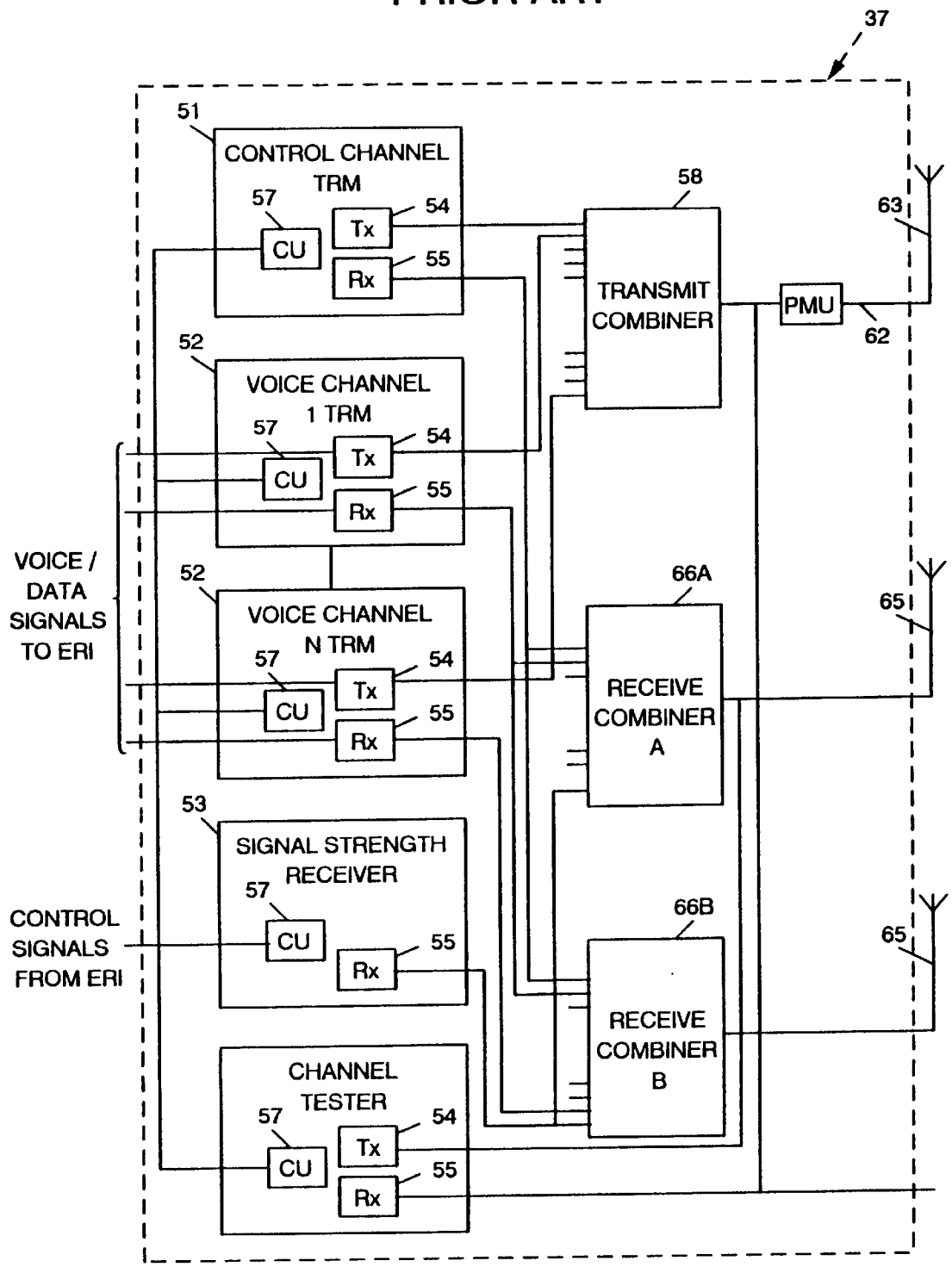
FIG. 3 is a schematic block diagram illustrating the functional elements of Radio Control Group of a base station as in the prior art.
Figure 4A:
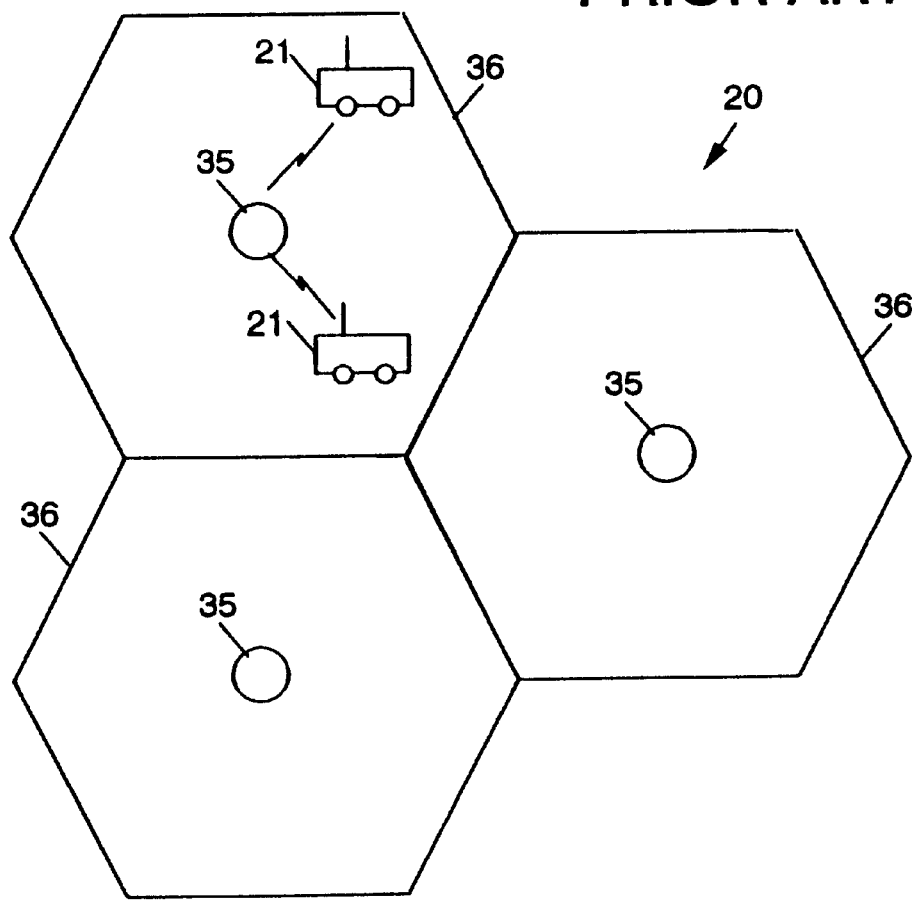
FIG. 4A is a schematic plan view illustrating an omnidirectional cellular pattern as in the prior art.
Figure 4B:
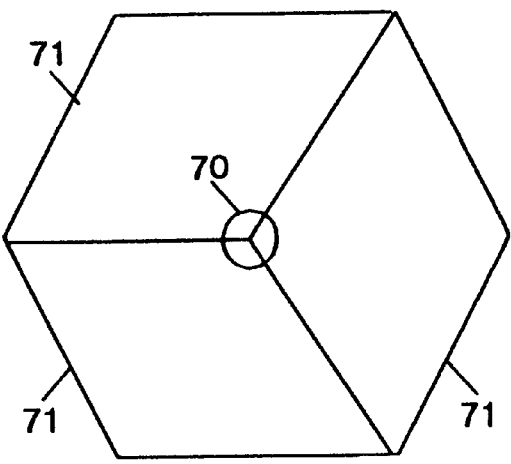
FIG. 4B is a schematic plan view illustrating a sectorized cellular pattern as in the prior art.
Figure 5:
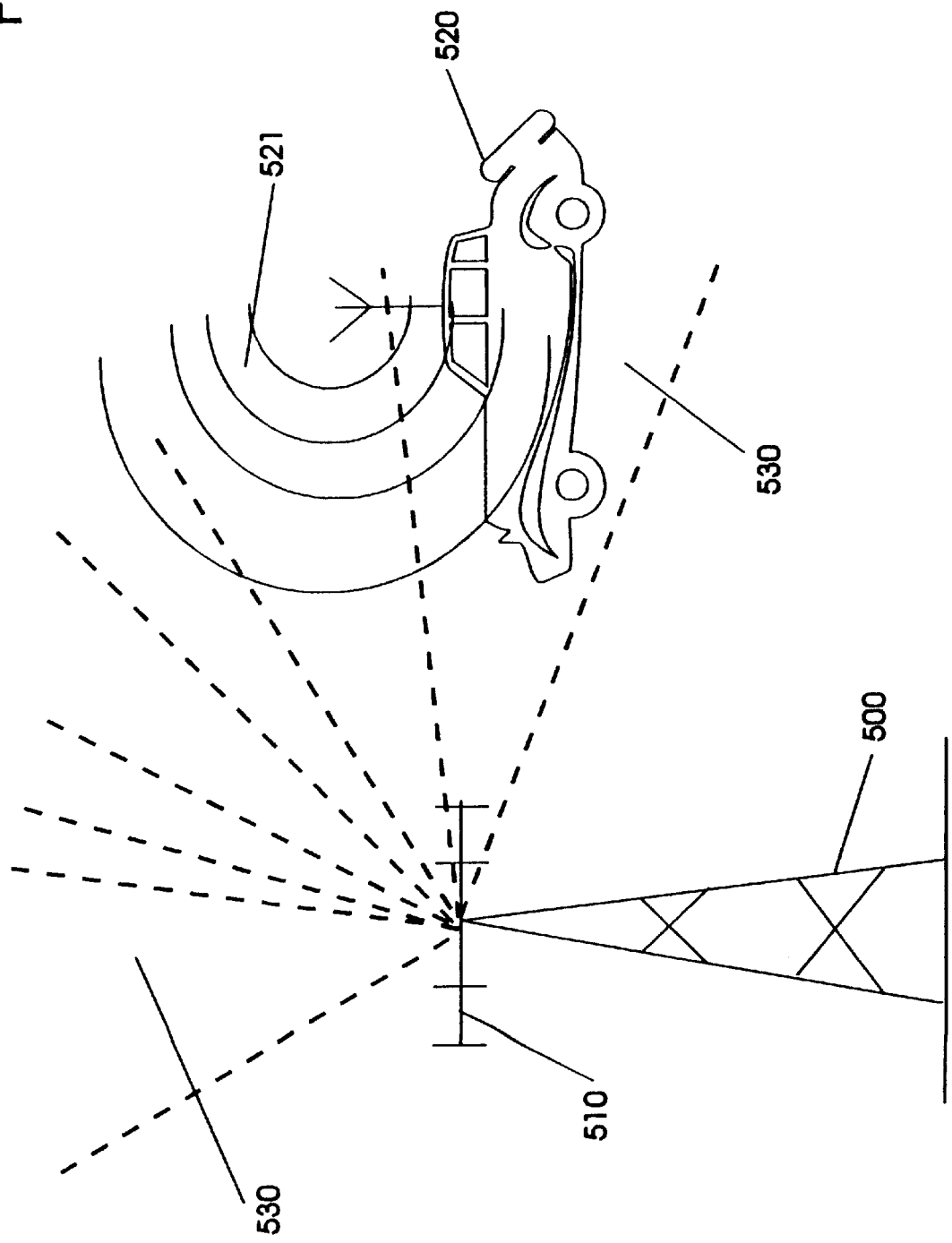
FIG. 5 is a schematic block diagram illustrating cellular radiotelephone communications between a cellular radiotelephone communications base station and a cellular radiotelephone.

Referring now to FIG. 5, cellular radiotelephone antenna array 510 at cellular radiotelephone communications base station 500 receives cellular radiotelephone communications energy 521 representing cellular radiotelephone communications 501 from cellular radiotelephone 520. Cellular radiotelephone communications energy 521 is received from coverage sectors 530. It will be understood by those skilled in the art that antenna array 510 is typically employed for both reception and transmission at base station 500. It will also be understood that antenna array 510 may include multiple individually mounted antennas or subarrays spaced to achieve enhanced communications quality though spatial diversity reception.

Figure 6:
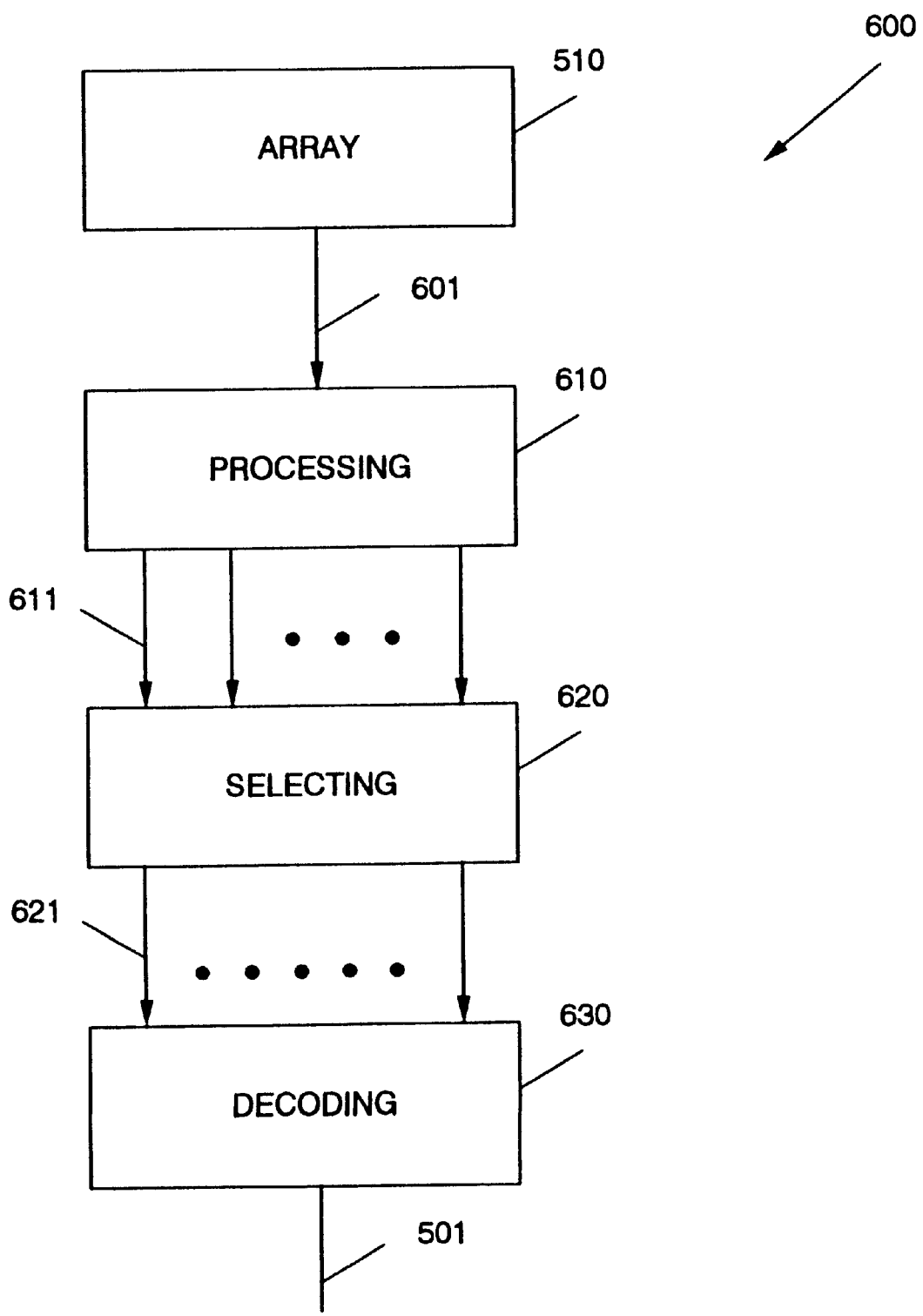
FIG. 6 is a block diagram illustrating a cellular radiotelephone base station according to the present invention.

Referring to FIG. 6, cellular radiotelephone communications signal processing means 610, responsive to received radiotelephone communications energy 601 from radiotelephone receive antenna array 510, produces at least three processed radiotelephone communications signals 611. Each processed signal 611 represents the cellular radiotelephone communications energy received in a particular coverage sector 530. As will be understood by those skilled in the art, a coverage sector 530 may correspond to one or more beams representing the gain of the antenna array 510 with respect to a particular processed signal 611.

Processed radiotelephone communications signal selecting means 620 selects at least two but less than all of the at least three processed cellular radiotelephone communications signals 611. Selecting means 620 preferably selects on a basis such as signal power or signal quality. It will be understood by those skilled in the art that various measures of signal power or signal quality may be used, alone or in combination, such as correlation of sync words or carrier-to-noise ratio.

Decoding means 630 decodes radiotelephone communications 501 from the at least two selected processed cellular radiotelephone communications signals 621. Preferably, decoding means 630 comprises equalizing means for combining the at least two selected processed radiotelephone communications signals 621. An example of an equalization process is described in U.S. Pat. No. 5,285,480 to Chennakeshu et al, while equalization is generally described in "Digital Communications" by J. Proakis, published by McGraw-Hill, 1983. It will be understood by those skilled in the art that other means for decoding selected processed signals 621, such as switched or equal-gain combiners with two or more input branches, may be used with the present invention.

Figure 7:
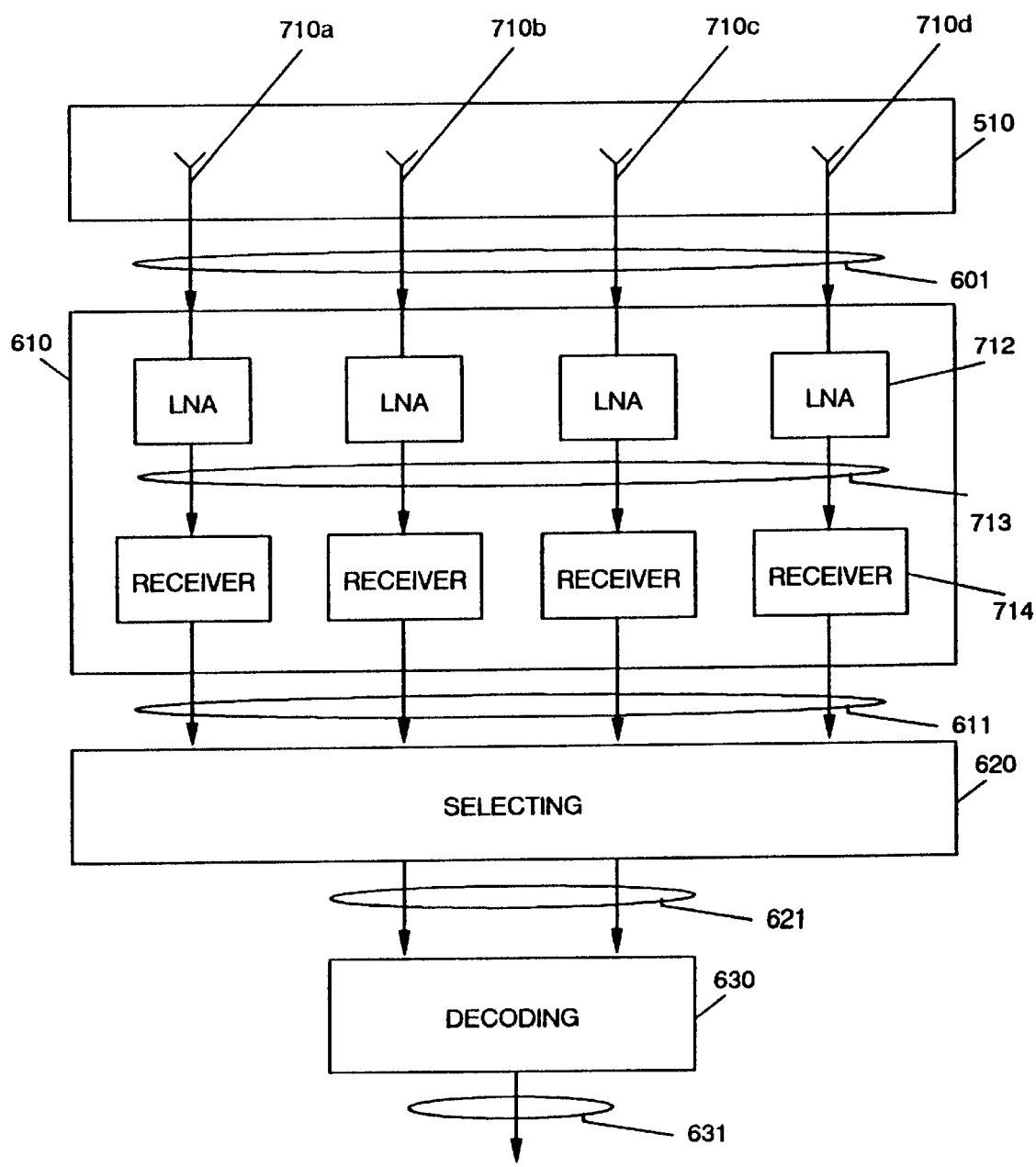
FIG. 7 is a block diagram illustrating a cellular radiotelephone base station according to the present invention.

FIG. 7 illustrates a cellular radiotelephone base station including selected diversity reception according to the present invention. Antenna array 510 includes four antenna array elements 710a–d. It will be understood by those skilled in the art that array elements 710 may include individual dipoles, subarrays of dipoles or other elements, or other configurations. Processing means 620 typically comprises low-noise amplifiers 722 electrically coupled to array elements 712. Low-noise amplifiers 722 process radiotelephone communications energy 601 from antenna array 510 to produce amplified radiotelephone communications signals 713 for input into receivers 714. Receivers 714 produce processed radiotelephone communications signals 611. Selecting means 620 typically selects two processed radiotelephone communications signals 621 from processed radiotelephone communications signals 611 on a basis such as highest power or signal quality. Selected processed radiotelephone communications signals 621 are decoded by decoding means 630 to produce radiotelephone communications 501.

It will be understood by those skilled in the art that other arrangements of processing means 610, selecting means 620 and decoding means 630 may be used with the present invention. For example, all or part of decoding means 630, such as demodulation functions, may be included in processing means 610, such that selecting means 620 operates in a post-detection mode. It will also be understood by those skilled in the art that signal processing means 610, signal selecting means 620, and decoding means 630 can be discrete or combined units, general purpose processors with software, special purpose hardware, or combinations thereof.

It will be understood by those skilled in the art that enhanced communications quality may be achieved by the use of polarization diversity reception. Polarization diversity reception involves the combining of signals corresponding to received communications energy having different, preferably orthogonal, polarizations. Polarization diversity reception takes advantage of the fact that radio waves emanating from the same source but having different polarizations generally exhibit low correlation. Polarization diversity reception compensates for polarization cross-coupling and for polarization mismatch arising from the misalignment of the antenna of a mobile unit with respect to the antenna of the base station.

Figure 8:
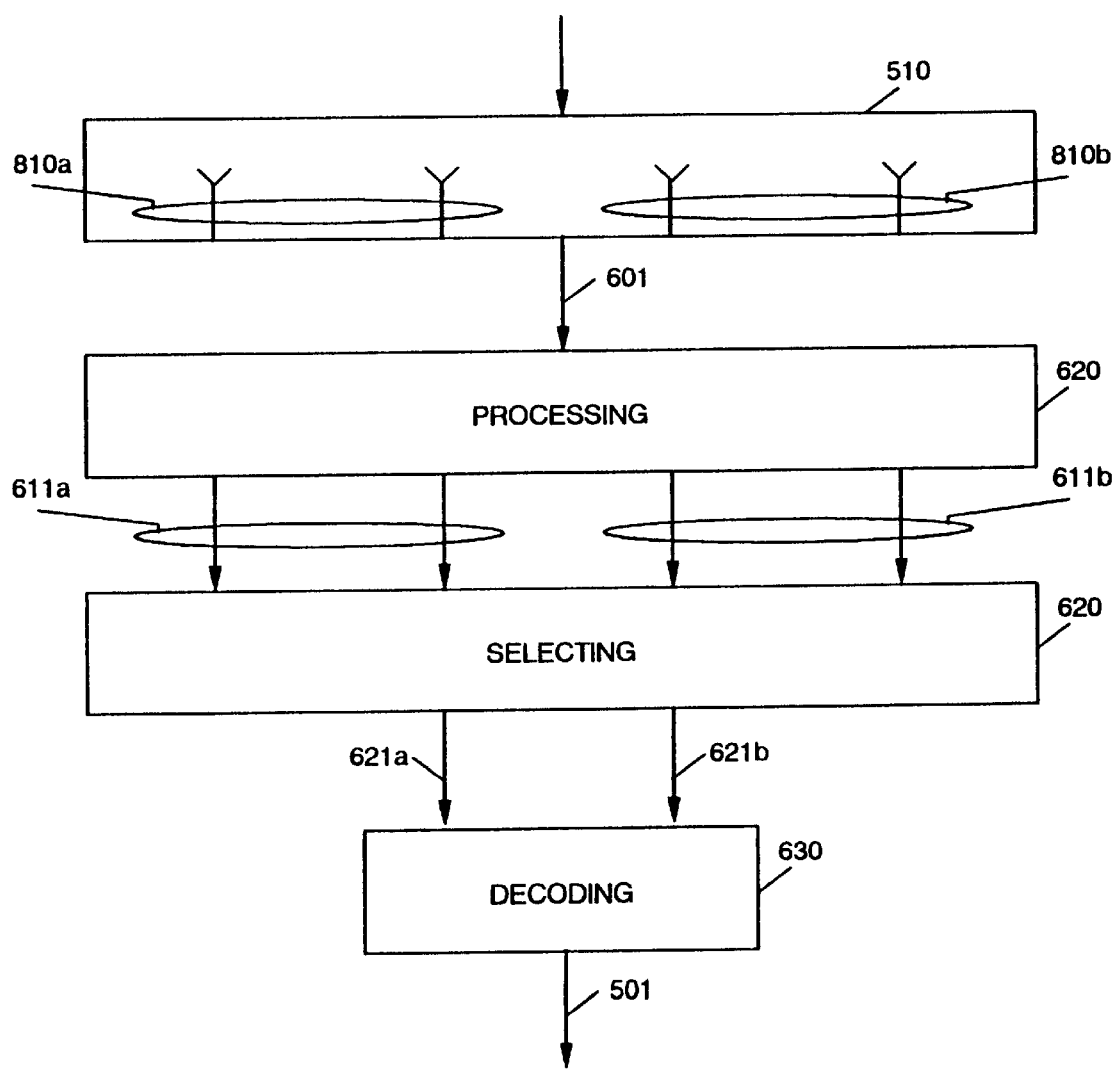
FIG. 8 is a block diagram illustrating a cellular radiotelephone base station including polarization diversity reception according to the present invention.

FIG. 8 illustrates a cellular radiotelephone base station providing for enhanced communications quality including selected polarization diversity reception according to the present invention. Processing means 610 produces two processed cellular radiotelephone communications signals 611a representing received cellular radiotelephone communications having a first polarization, and two processed cellular radiotelephone communications signals 611b representing received cellular radiotelephone communications energy having a second polarization. Preferably, these polarizations are orthogonal, such as horizontal and vertical or right hand circular and left hand circular. Selecting means 620 selects one processed cellular radiotelephone communications signal 621a representing the first polarization and one processed cellular radiotelephone communications signal 621b representing the second polarization, preferably on a basis such as highest power or highest signal quality. Decoding means 630 decodes radiotelephone communications 501 from the selected processed signals 621a and 621b.

Cellular radiotelephone antenna array 510 may include antennas 810a for receiving radiotelephone communications energy having a first polarization and antennas 810b for receiving radiotelephone communications energy having a second polarization. For example, antennas 810a may include vertical dipoles and antennas 810b may include horizontal dipoles. It will be understood by those skilled in the art that antennas providing various coverage sectors and polarization configurations may be used with the present invention, including those producing overlapping sectors, overlapping polarizations, alternating polarizations and combinations thereof. It will also be understood that antennas 810a and 810b may be co-located or spaced apart so as to enhance communications quality through spatial diversity reception.

It will be understood by those skilled in the art that beamforming may be used to provide a multi-beam gain pattern from an antenna array. Typically, beamforming techniques are used to produce a multi-beam pattern from an array of precisely-spaced antenna array elements. Beamforming techniques include various ways of interconnecting elements and controlling the amplitude and phase of the currents in the elements of an array. Examples of beamforming techniques are found in "Phased Array Antenna Handbook" by Robert J. Mailloux, published by Artech House, Norwood, Mass., 1994. As will be understood by those skilled in the art, outputs from individual antenna elements may be combined in various ways to produce single or multiple composite outputs exhibiting any number of gain characteristics.

Figure 10A:
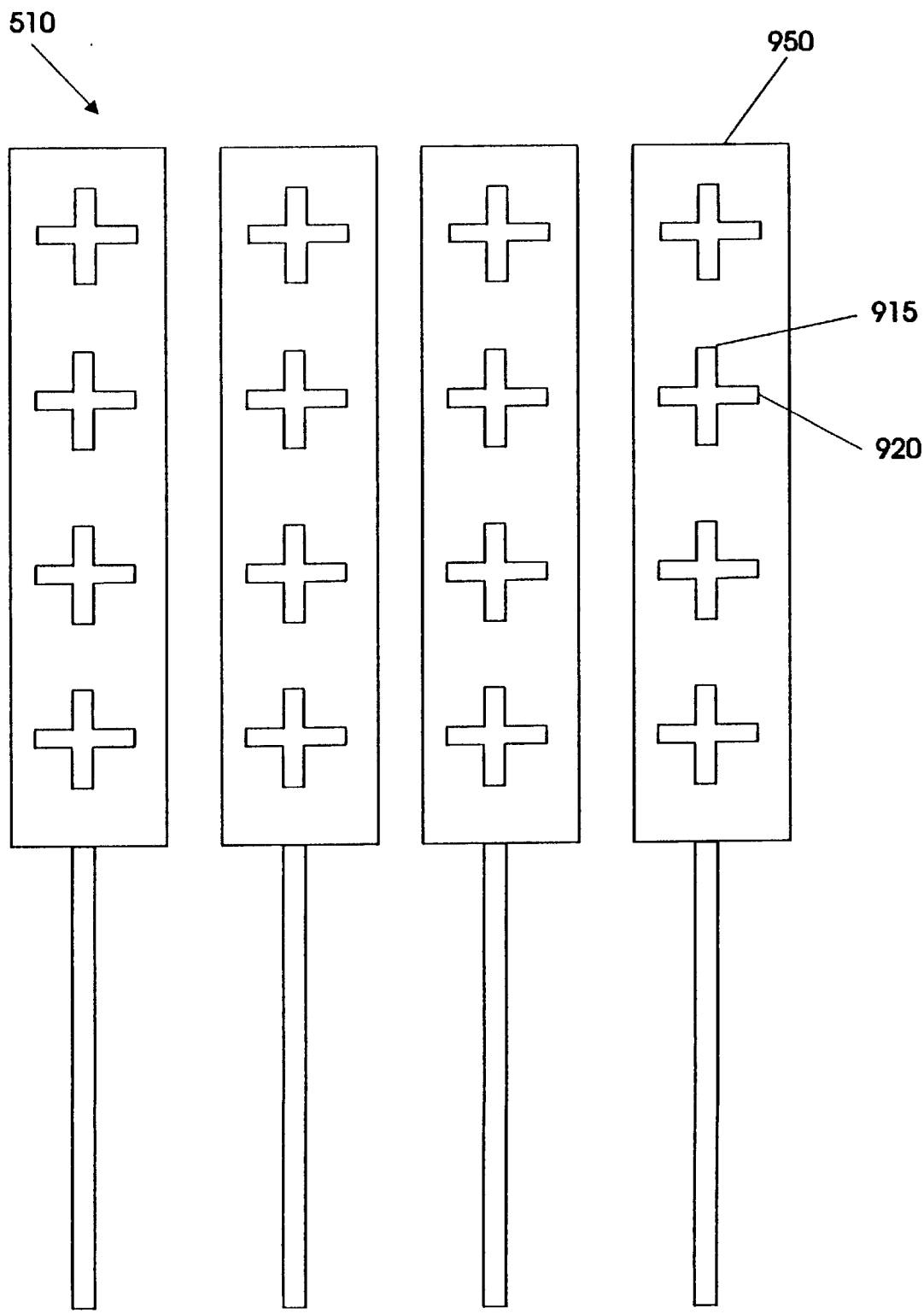
FIG. 10a is a front perspective view of a cellular radiotelephone antenna array according to the present invention.

FIG. 9 illustrates a base station including selected polarization diversity reception and beamforming according to the present invention. Cellular radiotelephone antenna array 510 includes four antenna array elements 910a for receiving radiotelephone communications energy of a first polarization, and four antenna array elements 910b for receiving radiotelephone communications energy having a second polarization. An example of antenna array 510 is illustrated in FIG. 10a, wherein antenna array elements 901a and 910b include four vertical subarrays of vertical dipoles 912 co-located with four horizontal subarrays of dipoles 914.

Figure 10B:
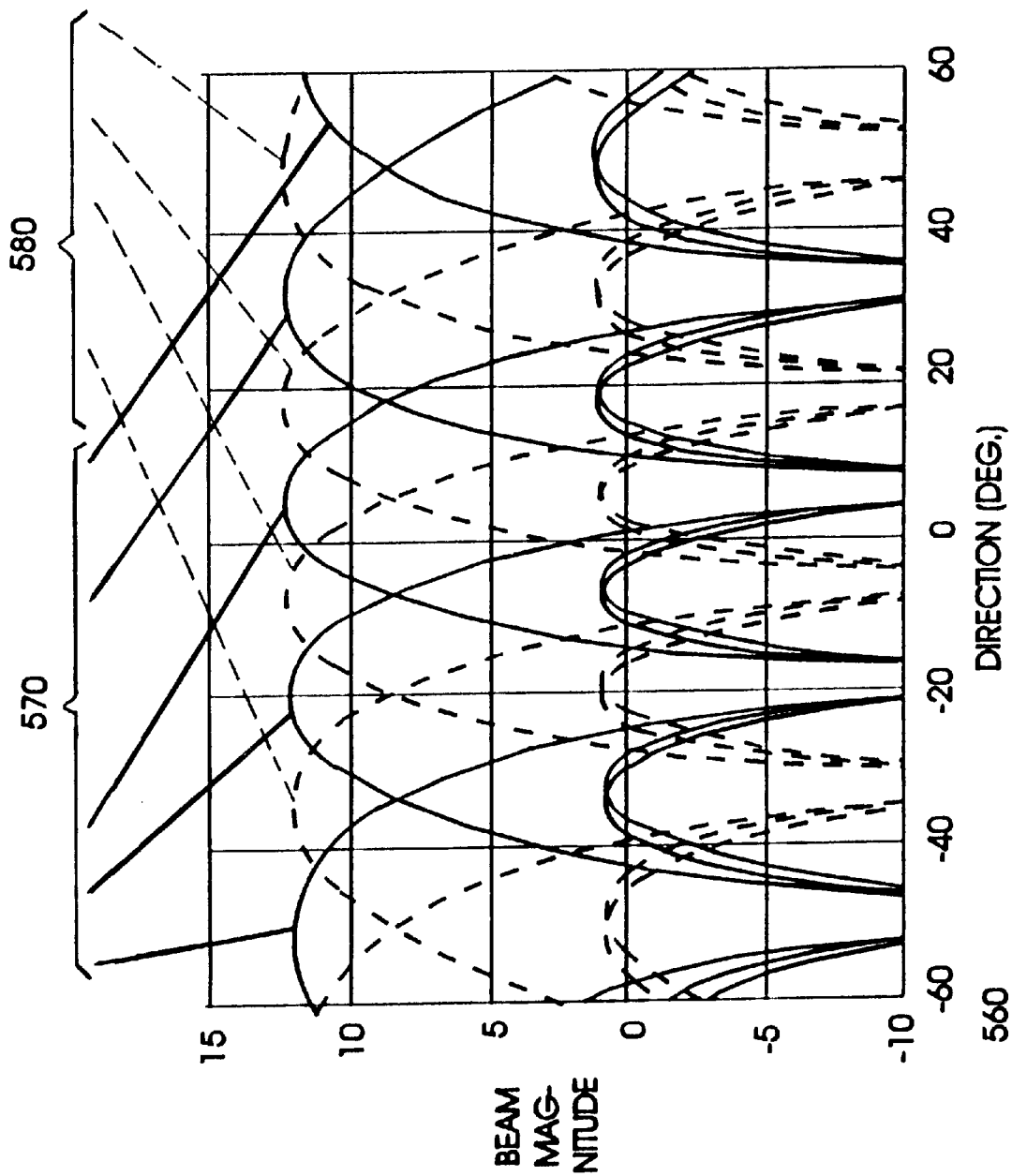
FIG. 10b is a plot of a gain pattern of a cellular radiotelephone base station including polarization diversity and beamforming according to the present invention.

Signal processing means 610 comprises beamforming means 920 and produces eight processed radiotelephone communications signals 911a and 911b from received cellular radiotelephone communications energy 601, with processed signals 911a representing cellular radiotelephone communications energy having a first polarization and processed signals 911b representing radiotelephone communications energy having a second polarization. An example of a typical composite gain pattern 560, representing the composite gain of the combination of antenna array 510 and processing means 610 with respect to processed signals 911a and 911b is shown in FIG. 10b. Horizontal polarization beams 570 preferably overlap alternatively with vertical polarization beams 580.

It will be understood by those skilled in the art that other configurations of cellular radiotelephone antenna array 510 and processing means 610 may be used with the present invention, and may produce other coverage sector and polarization patterns. For example, processing means 610 may resolve received cellular radiotelephone communications energy 601 into processed cellular radiotelephone communications signals representing other polarizations, such as circular or elliptic. It will also be understood that cellular radiotelephone antenna array 510 may comprise more antenna elements than the number of processed cellular radiotelephone communications signals produced by processing means 610 or may include antenna elements for receiving energy having polarizations other than vertical or horizontal.

Referring again to FIG. 9, processing means 610 produces four processed signals 911a representing received energy having vertical polarization and four processed signals 911b representing received energy having horizontal polarization. Selecting means 620 selects one signal 651a representing the vertical polarization and one signal 651b representing the horizontal polarization. Preferably, each of the selected signals comprises the signals from each polarization having the highest power or signal quality.

FIG. 6 also illustrates operations for receiving cellular radiotelephone communications from cellular radiotelephone including selected diversity reception according to the present invention. Cellular radiotelephone communications energy 521 is received in cellular radiotelephone communications antenna array 510. The received communications energy 601 is processed in cellular radiotelephone communications processing means 610 to produce at least three processed radiotelephone communications signals 611, each representing the radiotelephone communications energy received from a coverage sector 530. At least two of the processed signals are selected in processed radiotelephone selecting means 620, preferably on a basis such as power or signal quality. The selected processed signals 621 are decoded in decoding means 640 to produce the cellular radiotelephone communications 521.

FIG. 8 illustrates operations for a cellular base station communicating with at least one cellular radiotelephone including selected polarization diversity reception according to the present invention. Radiotelephone communications energy 521 is received in cellular radiotelephone communications antenna array 510. Received radiotelephone communications energy 601 is processed in cellular radiotelephone communications processing means 610 to produce at least two processed cellular radiotelephone communications signals 611a representing received radiotelephone communications energy having a first polarization and at least two processed cellular radiotelephone communications signals 611b representing received radiotelephone communications energy having a second polarization. In processed radiotelephone selecting means 620, at least one processed signal 621a is selected from the processed signals representing the first polarization and at least one processed signal 621b is selected from the processed signals representing the second polarization, preferably on a basis such as highest power or signal quality. The selected processed signals 621a and 621b are decoded in decoding means 630 to produce the cellular radiotelephone communications 501.

Figure 11:
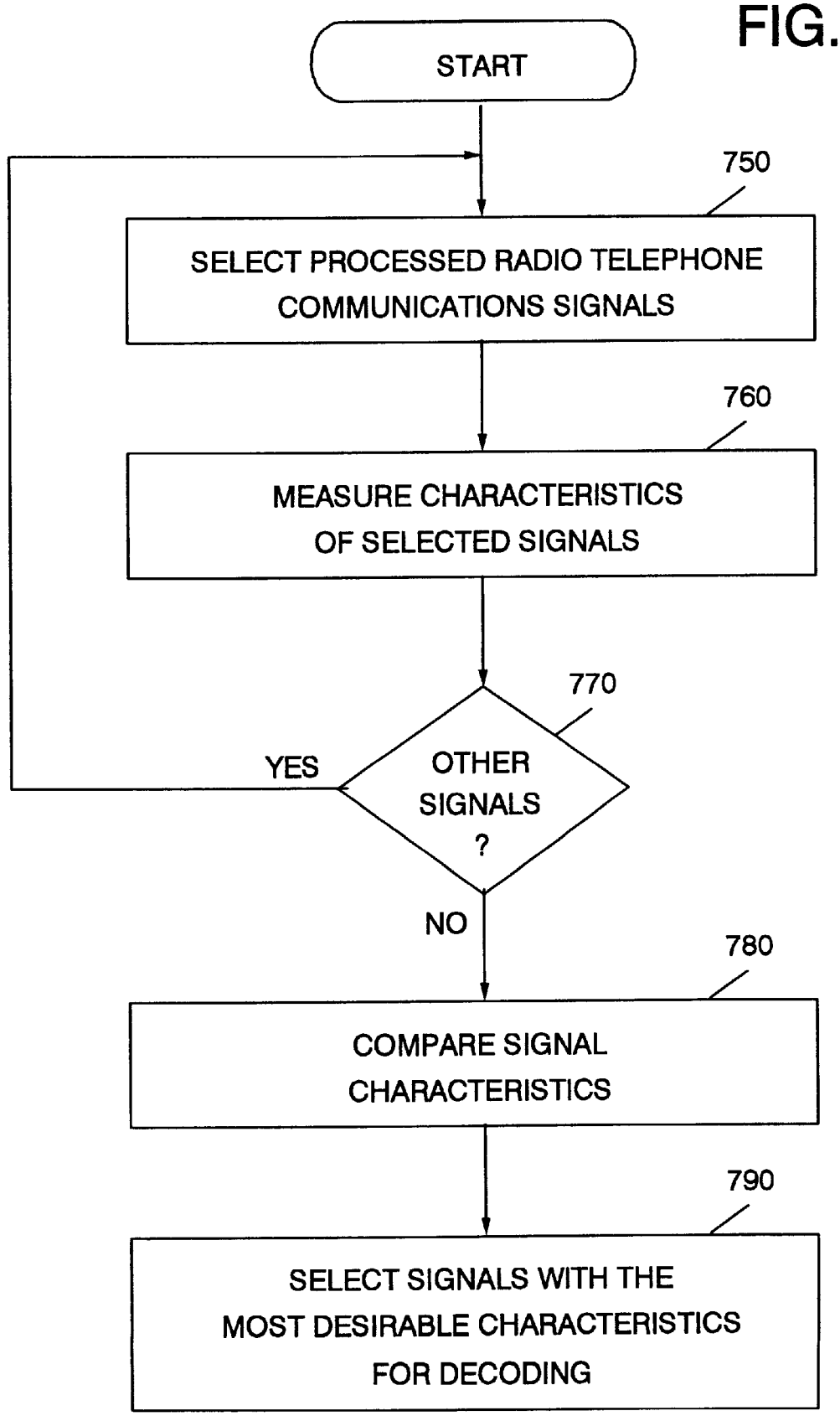
FIG. 11 is a block diagram illustrating operations for selecting processed radiotelephone signals according to the present invention.

FIGS. 6 and 11 illustrate operations for selecting processed radiotelephone communications for decoding in greater detail. At least one processed radiotelephone communications signal is selected in Block 750. In Block 760, characteristics of the selected signals are measured. The selecting operation of Block 750 is performed in selecting means 620, and the measuring operations of Block 760 is performed in decoding means 630. Typically, the measured characteristics will include such characteristics as signal power or signal quality. Decoding means may include equalizing means, with the measuring operations of Block 760 including an operation of determining fading coefficients as a measure of signal quality for each signal 621 in the equalizing means. The selecting and measuring steps of Blocks 750 and 760 are repeated until the characteristics of each of the processed radiotelephone communications signals are measured, as shown in Block 770. The measured characteristics of the signals are then compared in Block 780 and the signals having the most desirable characteristics are selected and decoded in decoding means 630 to produce cellular radiotelephone communications 501. It will be understood by those skilled in the art that the measuring operations of Block 760 may include determination of signal characteristics other than signal power or signal quality. It will also be understood that measurements of signal quality may include other characteristics, such as sync word correlation, instead of or in addition to fading coefficients.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A cellular radiotelephone base station for communicating with at least one cellular radiotelephone in a cellular radiotelephone communications system, said cellular radiotelephone base station comprising:

a cellular radiotelephone antenna array for receiving cellular radiotelephone communications energy representing cellular radiotelephone communications from cellular radiotelephones;

cellular radiotelephone communications processing means, responsive to said cellular radiotelephone antenna array, for processing the received cellular radiotelephone communications energy to produce at least three processed radiotelephone communications signals, each of said at least three processed radiotelephone communications signals representing cellular radiotelephone communications energy received from a coverage sector;

processed radiotelephone signal selecting means, responsive to said cellular radiotelephone communications processing means, for selecting at least two but less than all of said at least three processed radiotelephone communications signals; and combining decoding means, responsive to said processed radiotelephone signal selecting means, for decoding said radiotelephone communications concurrently from said at least two but not all of said at least three processed radiotelephone communications signals.

2. The cellular radiotelephone base station according to claim 1 wherein said selecting means comprises means for selecting at least two but less than all of said at least three processed radiotelephone communications signals having highest power.

3. The cellular radiotelephone base station according to claim 1 wherein said selecting means comprises means for selecting at least two but less than all of said at least three processed radiotelephone communications signals having highest signal quality.

4. A cellular radiotelephone base station according to claim 1 wherein said combining decoding means comprises equalizing means.

5. The cellular radiotelephone base station according to claim 1 wherein said radiotelephone communications signal processing means comprises beamforming means.

6. The cellular radiotelephone base station according to claim 1 wherein said cellular radiotelephone antenna array comprises at least three antenna elements.

7. A cellular radiotelephone base station according to claim 1:
   wherein said selecting means comprises means for selecting only two of said at least three processed radiotelephone communications signals; and
   wherein said combining decoding means comprises means for decoding said radiotelephone communications signals from said only two of said at least three processed radiotelephone communications signals.

8. A cellular radiotelephone base station for communicating with at least one cellular radiotelephone in a cellular radiotelephone communications system, said cellular radiotelephone base station comprising:
   a cellular radiotelephone antenna array for receiving cellular radiotelephone communications energy representing cellular radiotelephone communications from cellular radiotelephones;
   cellular radiotelephone communications processing means, responsive to said cellular radiotelephone antenna array, for processing the received cellular radiotelephone communications energy to produce at least two processed first polarization radiotelephone communications signals and at least two processed second polarization radiotelephone communications signals, each of said processed first polarization radiotelephone communications signals representing cellular radiotelephone communications energy received from a coverage sector and having a first polarization and each of said processed second polarization radiotelephone communications signals representing cellular radiotelephone communications energy received from a coverage sector and having a second polarization;
   processed radiotelephone signal selecting means, responsive to said cellular radiotelephone communications processing means, for selecting at least one but less than all of said at least two processed first polarization radiotelephone communications signals and at least one but less than all of said at least two processed second polarization radiotelephone communications signals; and
   combining decoding means, responsive to said processed radiotelephone signal selecting means, for decoding said radiotelephone communications concurrently from said at least one but less than all of said at least two processed first polarization radiotelephone communications signals and said at least one but less than all of said at least two processed second polarization radiotelephone communications signals.

9. The cellular radiotelephone base station according to claim 8 wherein said selecting means comprises means for selecting at least one but less than all of said at least two processed first polarization radiotelephone communications signals having highest power and at least one but less than all of said at least two processed second polarization radiotelephone communications signals having highest power.

10. The cellular radiotelephone base station according to claim 8 wherein said selecting means comprises means for selecting at least one but less than all of said at least two processed first polarization radiotelephone communications signals having highest signal quality and at least one but less than all of said at least two processed second polarization radiotelephone communications signals having highest signal quality.

11. A cellular radiotelephone base station according to claim 8 wherein said combining decoding means comprises equalizing means.

12. The cellular radiotelephone base station according to claim 8 wherein said radiotelephone communications signal processing means comprises beamforming means.

13. The cellular radiotelephone base station according to claim 8 wherein said cellular radiotelephone antenna array comprises at least three antenna elements.

14. A cellular radiotelephone base station according to claim 8:
   wherein said selecting means comprises means for selecting only one of said at least two processed first polarization radiotelephone communications signals and only one of said at least two processed second polarization radiotelephone communications signals; and
   wherein said combining means comprises means for decoding said radiotelephone communications signals from said only one of said at least two processed first polarization radiotelephone communications signals and said only one of said at least two processed second polarization radiotelephone communications signals.

15. The cellular radiotelephone base station according to claim 8 wherein said first polarization and said second polarization are orthogonal.

16. A method for operating a cellular base station for communicating with at least one cellular radiotelephone, the method comprising the steps of:
   receiving cellular radiotelephone communications energy representing cellular radiotelephone communications from cellular radiotelephones;
   processing said received cellular radiotelephone communications energy to produce at least three processed radiotelephone communications signals, each of said at least three processed radiotelephone communications signal representing cellular radiotelephone communications energy received from a coverage sector;
   selecting at least two but less than all of said at least three processed radiotelephone communications signals; and
   decoding said radiotelephone communications concurrently from said at least two but not all of said at least three processed radiotelephone communications signals.

17. The method according to claim 16 wherein said step of selecting comprises the step of selecting at least two but less than all of said at least three processed radiotelephone communications signals having highest power.

18. The method according to claim 16 wherein said step of selecting comprises the step of selecting at least two but less than all of said at least three processed radiotelephone communications signals having highest signal quality.

19. The method according to claim 16:
wherein said step of selecting comprises the step of selecting only two of said at least three processed radiotelephone communications signals; and wherein said step of decoding comprises the step of decoding said cellular radiotelephone communications signals from said only two of said at least three processed radiotelephone communications signals.

20. The method according to claim 16 wherein said step of decoding comprises the step of equalizing.

21. The method according to claim 16:
wherein said step of processing comprises the step of producing at least two processed cellular radiotelephone communication signals representing received cellular radiotelephone communications energy having a first polarization and at least two processed cellular radiotelephone communications signals representing the received cellular radiotelephone communications energy having a second polarization; and wherein said step of selecting comprises the step of selecting at least one of said at least two processed radiotelephone communications signals representing the received cellular radiotelephone communications energy having the first polarization and at least one of said at least two processed radiotelephone communications signals representing the received cellular radiotelephone communications energy having the second polarization; and wherein said step of decoding comprises the step of decoding said cellular radiotelephone communications from said at least one of said at least two processed radiotelephone communications signals representing the received cellular radiotelephone communications energy having the first polarization and said at least one of said at least two processed radiotelephone communications signals representing the received cellular radiotelephone communications energy having the second polarization.

22. The method according to claim 21 wherein said step of selecting comprises the step of selecting at least one of said at least two processed radiotelephone communications signals representing the received cellular radiotelephone communications energy having the first polarization having highest power and at least one of said at least two processed radiotelephone communications signals representing the received cellular radiotelephone communications energy having said second polarization having highest power.

23. The method according to claim 21 wherein said step of selecting comprises the step of selecting at least one of said at least two processed radiotelephone communications signals representing the received cellular radiotelephone communications energy having the first polarization having highest signal quality and at least one of said at least two processed radiotelephone communications signals representing the received cellular radiotelephone communications energy having the second polarization having highest signal quality.

24. The method according to claim 21:
wherein said step of selecting comprises the step of selecting only one of said at least two processed radiotelephone communications signals representing the received cellular radiotelephone communications energy having the first polarization and only one of said at least two processed radiotelephone communications signals representing the received cellular radiotelephone communications energy having the second polarization; and wherein said step of decoding comprises the step of decoding said cellular radiotelephone communications from said only one of said at least two processed radiotelephone communications signals representing the received cellular radiotelephone communications energy having the first polarization and said only one of said at least two processed radiotelephone communications signals representing the received cellular radiotelephone communications energy having the second polarization.

* * * * *

UNITED STATES PATENT AND TRADEMARK OFFICE
CERTIFICATE OF CORRECTION

PATENT NO. : 6,421,543 B1
DATED : July 16, 2002
INVENTOR(S) : Karl J. Molnar

It is certified that error appears in the above-identified patent and that said Letters Patent is hereby corrected as shown below:

Column 11,
Line 9, change "A cellular" to -- The cellular --.
Line 18, change "A cellular" to -- The cellular --.

Column 12,
Lines 16 and 25, change "A cellular" to -- The cellular --.
Line 52, change "signal" to -- signals --.

Signed and Sealed this

Twenty-fourth Day of February, 2004

JON W. DUDAS
*Acting Director of the United States Patent and Trademark Office*